United States Patent [19]

Krishnan et al.

[11] 4,346,211

[45] Aug. 24, 1982

[54] COPOLYCARBONATES PREPARED WITH 2,2'-BIS(P-HYDROXYPHENYL) 1,1,1,3,3,3-HEXAFLUOROPROPANE

[75] Inventors: Sivaram Krishnan, Moers, Fed. Rep. of Germany; Arthur L. Baron, New Martinsville, W. Va.

[73] Assignee: Mobay Chemical Corporation, Pittsburgh, Pa.

[21] Appl. No.: 194,650

[22] Filed: Oct. 6, 1980

Related U.S. Application Data

[63] Continuation-in-part of Ser. No. 86,891, Oct. 22, 1979, abandoned.

[51] Int. Cl.$^3$ .............................................. C08G 63/62
[52] U.S. Cl. .................................... 528/202; 528/125; 528/126; 528/128; 528/173; 528/174; 528/201; 528/204; 528/370; 528/371; 528/372
[58] Field of Search ............... 528/202, 201, 204, 125, 528/126, 128, 173, 174, 370–372

[56] References Cited

U.S. PATENT DOCUMENTS

| | | | |
|---|---|---|---|
| 3,220,978 | 11/1965 | Jaquiss | 528/202 |
| 3,248,366 | 4/1966 | Schmitt et al. | 528/202 |
| 3,328,352 | 6/1967 | Kwolek | 528/202 |
| 3,340,310 | 9/1967 | Gilbert et al. | 260/619 |
| 3,413,266 | 11/1968 | Saines et al. | 528/202 |
| 3,739,035 | 6/1973 | Webb et al. | 528/202 |

FOREIGN PATENT DOCUMENTS

| | | | |
|---|---|---|---|
| 965085 | 7/1964 | United Kingdom | 528/202 |
| 1141716 | 1/1969 | United Kingdom | 528/202 |

OTHER PUBLICATIONS

Polycarbonates, Christopher and Fox, Reinhold Publishing Corporation, N.Y. 1962.

Yakubovich et al., *Thermally Stable Fluorine–Containing Aromatic Esters and Polycarbonates*, C.A., vol. 55, p. 11369, 1961.

*Primary Examiner*—Lester L. Lee
*Attorney, Agent, or Firm*—Gene Harsh; Lawrence S. Pope; Aron Preis

[57] ABSTRACT

Copolycarbonate resins are prepared from an aromatic diol and a carbonic acid derivative. 2,2-bis(p-hydroxyphenyl) 1,1,1,3,3,3-hexafluoropropane is co-reacted in a minor amount with the aromatic diol and carbonic acid derivative to form a polycarbonate having improved heat distortion characteristics.

13 Claims, No Drawings

COPOLYCARBONATES PREPARED WITH 2,2'-BIS(P-HYDROXYPHENYL) 1,1,1,3,3,3-HEXAFLUOROPROPANE

This application is a continuation-in-part of our copending application Ser. No. 86,891 filed Oct. 22, 1979, now abandoned.

BACKGROUND OF THE INVENTION

1. Field of the Invention

This invention relates to polycarbonates and more particularly to polycarbonates having improved heat distortion characteristics.

2. Description of the Prior Art

Polycarbonate resins derived from reactions involving organic dihydroxy compounds and carbonic acid derivatives have found extensive commercial application because of their excellent mechanical and physical properties. These thermoplastic polymers are particularly suited for the manufacture of molded articles requiring impact strength, rigidity, toughness, thermal and dimensional stability as well as excellent electrical properties.

When a polycarbonate article is to be used in above ambient temperature environments, it is necessary that the polycarbonate be adapted to have proper physical properties at these temperatures. For example, polycarbonates have found extensive use in automotive applications due to their light weight in relation to their strength characteristics. When the polycarbonate is used in such applications, it must retain its dimensional stability during manufacture of the automobile. Particularly the polycarbonate must retain its dimensional stability in a paint oven or during similar high temperature processing of the vehicle.

Further, polycarbonates have been found useful in the appliance industry, for example in industrial power tool housings and similar applications wherein the tool, and hence the polycarbonate, is required to withstand continuous use at elevated temperatures.

All of these applications require dimensional stability at elevated temperatures.

Polycarbonates have been proposed and prepared which are useful at elevated temperatures. Exemplary of such proposed polycarbonates are those based upon fully fluorinated diphenolic compounds and optionally including such diols as 2,2'-bis(p-hydroxyphenyl) 1,1,1,3,3,3-hexafluoropropane as are disclosed in British Pat. No. 1,141,716 to Monsanto Chemicals, Ltd.

Accordingly, in order to provide this dimensional stability at elevated temperatures one would expect that an increase in molecular weight and hence a decrease in melt flow rate would necessarily improve the dimensional stability. However, this increase in molecular weight brings along with it a requirement that the processing temperature of the polycarbonate be increased in order to achieve the required processing. The increased processing temperature introduces problems such as thermal degradation and molding problems.

In accordance with the present invention, a polycarbonate is provided which has improved dimensional stability at elevated temperatures while retaining a relatively high melt flow rate for good processibility. Further, a polycarbonate prepared in accordance with the present invention can be synthesized in accordance with conventional techniques.

BRIEF DESCRIPTION OF THE INVENTION

Copolycarbonate resins are prepared from an aromatic diol and a carbonic acid derivative. 2,2'-bis(p-hydroxyphenyl) 1,1,1,3,3,3-hexafluoropropane is co-reacted in a minor amount with the aromatic diol and carbonic acid derivative to form a polycarbonate having improved heat distortion characteristics.

DETAILED DESCRIPTION OF THE INVENTION

When used herein "copolycarbonate resin" means the neat resin without additives; "polycarbonate" means both the formulated polycarbonate or copolycarbonate resin with additives therein and also the final molded plastic product. "Aromatic diol" means an aromatic diol having no fluorine atoms therein. "Aromatic dihydroxy compound" means any or all compounds which are aromatic diols and fluorinated aromatic diols.

The copolycarbonate resins useful in practice of the invention are produced by reacting di-(monohydroxyaryl)-alkanes or dihydroxybenzenes and substituted dihydroxybenzenes with derivatives of the carbonic acids such as carbonic acid diesters, phosgene, bis-chloro-carbonic acid esters of di-(monohydroxyaryl)-alkanes and the bis-chloro-carbonic acid esters of the dihydroxybenzenes and the substituted dihydroxybenzenes.

The two aryl residues of the di-(monohydroxyaryl)-alkanes applied according to the invention can be alike or different. The aryl residues can also carry substituents which are not capable of reacting in the conversion into polycarbonates, such as halogen atoms or alkyl groups, for example, the methyl, ethyl, propyl or tert-butyl groups. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are, for example (4,4'-dihydroxy-diphenyl)-methane; 2,2'-(4,4'-dihydroxy-diphenyl)-propane; 1,1-(4,4'-dihydroxy-diphenyl)-cyclohexane; 1,1-(4,4'-dihydroxy-3,3'-dimethyl-diphenyl)-cyclohexane; 1,1-(2,2'-dihydroxy-4,4'-dimethyl-diphenyl)-butane; 2,2-(2,2'-dihydroxy-4,4'-di-tert.-butyl-diphenyl)-propane; or 1,1'-(4,4'-dihydroxy-diphenyl)-1-phenyl-ethane. Furthermore, methane derivatives which carry, besides two hydroxyaryl groups, an alkyl residue with at least two carbon atoms and a second alkyl residue with one or more carbon atoms, such as 2,2-(4,4'-dihydroxy-diphenyl)-butane; 2,2-(4,4'-dihydroxy-diphenyl)-pentane (melting point 149°–150° C.); 3,3-(4,4'-dihydroxy-diphenyl)-pentane; 2,2-(4,4'-dihydroxy-diphenyl)-hexane; 3,3-(4,4'-dihydroxy-diphenyl)-hexane; 2,2-(4,4'-dihydroxy-diphenyl)-4-methyl-pentane; 2,2-(4,4'-dihydroxy-diphenyl)-heptane; 4,4-(4,4'-dihydroxy-diphenyl)-heptane (melting point 148°–149° C.) or 2,2-(4,4'-dihydroxy-diphenyl)-tri-decane. Suitable di-(monohydroxyaryl)-alkanes, the two aryl residues of which are different, are, for example, 2,2-(4,4'-dihydroxy-3'-methyl-diphenyl)-propane and 2,2-(4,4'-dihydroxy-3-methyl-3'-isopropyl-diphenyl)-butane. Suitable di-(monohydroxyaryl)-alkanes, the aryl residues of which carry halogen atoms except for fluorine, are for instance 2,2-(3,5,3'5'-tetra-chloro-4,4'-dihydroxy-diphenyl)-propane; 2,2-(3,5,3'5'-tetrabromo-4,4'-dihydroxy-diphenyl)-propane; and (3,3'-dichloro-4,4'-dihydroxy-diphenyl)-methane. Suitable di-(monohydroxyaryl)-alkanes, the alkyl residue of which, linking the two benzene rings, is substituted by an aryl residue are for instance (4,4'-dihydroxy-diphenyl)-phenylmethane and 1,1,-(4,4'-dihydroxy-diphenyl)-1-phenylethane.

Suitable dihydroxybenzenes and substituted dihydroxybenzenes are hydroquinone, resorcinol, pyrocatechol, methyl hydroquinone and the like. Other suitable dihydroxy-aromatic compounds are 4,4'-dihydroxydiphenylene, 2,2'-dihydroxy-diphenylene, dihydroxynaphthalene, dihydroxyanthracene and compounds represented by the structural formula:

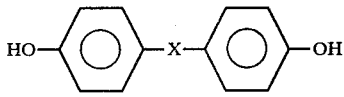

wherein X is S,

In order to obtain special properties, mixtures of various di-(monohydroxyaryl)-alkanes can also be used, thus mixed polycarbonate resins are obtained. By far the most useful polycarbonate resins are those based on 4,4'-dihydroxydiaryl methanes and more particularly bishphenol A [2,2-(4,4'-dihydroxy-diphenyl)-propane].

When flame retardant characteristics are to be imparted to the basic polycarbonate resin, a mixture of bisphenol A and tetrabromobisphenol A [2,2-(3,5,3'5'-tetrabromo-4,4'dihydroxy-diphenyl)-propane] is utilized when reacting with phosgene or a like carbonic acid derivative.

The polycarbonate resins are those having a weight average molecular weight from 10,000 to 200,000 and preferably a melt flow rate range of 1 to 24 g/10 min. according to ASTM 1238 condition 0 and are prepared by methods known to those skilled in the art and more particularly by methods disclosed in U.S. Pat. Nos. 3,028,365; 2,999,846; 3,248,414; 3,153,008; 3,215,668; 3,187,065; 2,964,974; 2,970,137; 2,991,273 and 2,999,835 all incorporated herein by reference.

The 2,2-bis(p-hydroxyphenyl)1,1,1,3,3,3 hexafluoropropane can be used as a comonomer at any desired level. However, it has been found that under 10% and preferably under 5% by weight of the total dihydroxy monomer as the 2,2-bis(p-hydroxyphenyl)1,1,1,3,3,3 hexafluoropropane is useful in providing higher heat distortion temperatures over polycarbonate resins without the added monomer base polycarbonate. Further, it has been found that as little as 2.5% by weight of the fluorinated monomer will impart the desired properties while maintaining a low melt flow rate.

This result is surprising in view of U.S. Pat. Nos. 3,248,366 and 3,340,310 which teach that polycarbonates, (i.e., homopolycarbonates) derived from 2,2-bis(p-hydroxyphenyl)1,1,1,3,3,3 hexafluoropropane, exhibit poor high temperature characteristics.

The preferred process for preparing the polycarbonates in accordance with the present invention is the interfacial polycondensation process.

According to the interfacial polycondensation process, polycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide, or bischloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight one may use monofunctional reactants such as monophenols, for example, the propyl-, isopropyl- and butyl-phenols, especially p-tert-butyl-phenol and phenol itself. In order to accelerate the reaction, catalysts such as tertiary amines, quaternary ammonium, phosphonium or arsonium salts and the like may be used. The reaction temperature should be about $-20°$ L to 150° C., preferably 0° to 100° C.

According to the polycondensation process in a homogeneous phase, the dissolved reaction components are polycondensed in an inert solvent in the presence in an equivalent amount of a tertiary amine base required for absorption of the generated HCL, such as, for example, N,N-dimethylaniline, N,N-dimethyl-cyclohexyl amine, or preferably, pyridine and the like.

In still another process a diaryl carbonate can be transesterified with the aromatic dihydroxy compounds to form the polycarbonate resin.

It is to be understood that it is possible to combine in the processes described above in a chemically meaningful way, the aromatic dihydroxy compounds, monohydroxy compounds in the form of the alkali metal salts and/or bishaloformic acid esters, and the amount of phosgene or carbonyl bromide then still required in order to obtain higher molecular weight products. Other methods of synthesis in forming the polycarbonates of the invention such as disclosed in U.S. Pat. No. 3,912,688, incorporated herein by reference, may be used.

The copolycarbonate resin prepared in accordance with the invention can be compounded with a variety of other additives known to those skilled in the art. For example, pigments may be added to the polycarbonate to form opaque colored molded products. Predominantly, titanium dioxide is used to opacify the polycarbonate to form a white molded product. If a colored product is desired, pigments such as chrome yellows and oranges, and chrome greens may be added to provide various colors to the article. Also, oil soluble dyes may be incorporated into the polycarbonate to impart color to the final molded article. In order to color the polycarbonate minimal amounts of colorant, i.e., 0.01 to 10 g colorant/lb. polycarbonate are necessary.

The invention will further be illustrated but is not intended to be limited by the following examples.

EXAMPLE I

An aqueous solution was prepared by simultaneously charging to a suitable premix vessel with agitation 13.62 kg of bisphenol A [2,2-(p-dihydroxyphenyl)propane]; 9.81 kg of a 50% aqueous sodium hydroxide solution; 67.22 kg of water; 280 g of p-tert-butyl-phenol; and 4 g of NABH$_4$. 34 kg/hr of the above solution was continuously phosgenated with 0.24 kg/hr of phosgene in 50 kg of 1:1 methylene chloride: chlorobenzene solvent. After the first half-hour was completed as above described, a premixed solution composed of 0.460 kg of 2,2-(p-dihydroxyphenyl)1,1,1,3,3,3 hexafluoropropane, 0.224 kg of aqueous sodium hydroxide solution and 8.52 kg of water was added at the rate of 2.67 kg/hr. Commencing with the addition of the fluorinated bisphenol solution 24.15 kg/hr of a 25% aqueous sodium hydroxide solution was continuously added to the reaction mixture to provide the proper basicity for the interfacial polycondensation. The precondensate as above obtained was then mixed with a solution 0.18 kg/hr of triethylamine and 2.8 kg/hr of 25% aqueous sodium hydroxide solution and further reacted in a stirred kettle cascade over the course of an average dwell time of 30 minutes. The organic phase was separated from the aqueous phase and the organic phase washed with 1% aqueous sodium hydroxide solution, separated and then the organic phase was washed with 1% aqueous phosphoric acid solution and separated. The organic phase was simultaneously washed and separated three times with water. The polymer was recovered from the organic phase by concentrating the polymer by solvent evaporation and subsequently passing the polymer through a devolatilizing extruder. The polymer as above prepared had the following phenolic monomers polymerized therein.

| COMPOUND | WEIGHT PERCENT |
|---|---|
| bisphenol A | 97.5 |
| 2,2(p-dihydroxyphenyl) 1,1,1,3,3,3-hexafluoropropane | 2.5 |

The polymer as above prepared was pelletized and tested for physical, optical and rheological properties. The test results are reported on Table 1.

TABLE 1

|  | Example 1 | Bisphenol A Homopoly-carbonate |
|---|---|---|
| Melt Flow Index g/10 min (ASTM 1238) | 8.6 | 3.6 |
| Heat Distortion Temperature at 264 psi (ASTM D 648) | 141° C. | 131° C. |
| Optical Properties | | |
| % Brightness | | |
| 550° F. molding | 86.98 | 85.96 |
| 700° F. molding | 86.41 | 85.74 |
| % Yellowness | | |
| 550° F. molding | 6.8 | 7.2 |
| 700° F. molding | 8.0 | 8.0 |
| Melt Stability at 300° C. | | |
| 5 min, melt viscosity PaS | 580 | 2445 |
| 35 min, melt viscosity PaS | 665 | 3020 |
| 55 min, melt viscosity PaS | 680 | 3050 |
| Impact Properties | | |
| Izod Impact ⅛" notched ft-lbs/in (J/m) | 15.67 (836.46) | |
| Izod Impact 174 " notched ft-lbs/in (J/m) | 2.43 (129.71) | |
| Critical Thickness, mils (mm) | 187 (4.75) | |
| Tensile Properties | | |
| Yield, MPa | 62.0 | |
| Ultimate, MPa | 62.12 | |
| Failure, MPa | 63.43 | |
| Flexural Properties | | |
| Flexural Modulus psi (GPa) | 3.26 × 10⁵ (2.07) | |
| Flexural Strength at Yield psi (MPa) | 12.30 × 10³ (84.9) | |
| Ultimate Flexural Strength psi (MPa) | 12.30 × 10³ (84.9) | |
| Flammability UL-94 (⅛") | V-2 | |

Table 1 exemplifies that copolycarbonates having therein a minor amount of 2,2-(p-dihydroxyphenyl) 1,1,1,3,3,3-hexafluoropropane exhibit improved heat distortion temperatures while having a melt flow rate substantially higher than a homopolycarbonate having a lower heat distortion temperature. Further, the copolycarbonate in accordance with the present invention is easily processed while maintaining its high heat distortion temperature. Further, Table 1 also demonstrates by the copolycarbonates' optical properties and melt stability, that such copolycarbonates can be molded at elevated temperatures without substantial degradation.

Thus, although the present invention has been described with reference to a specific example, using specific processes, the invention is only to be limited so far as is set forth in the accompanying claims.

What is claimed is:

1. In a polycarbonate resin based on the reaction product of a fluorine-free aromatic diol and a carbonic acid derivative the improvement comprising:
   a fluorinated difunctinal phenolic compound represented by the structural formula:

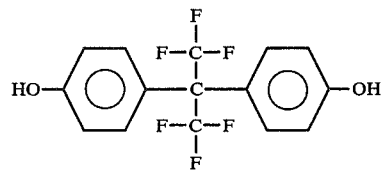

co-reacted in said reaction product.

2. A polycarbonate resin of claim 1, wherein said fluorinated difunctional phenolic compound is co-reacted in said reaction product in an amount sufficient to improve the heat distortion temperature of said polycarbonate resin.

3. The polycarbonate resin of claim 2, having therein up to 10 percent by weight of said fluorinated difunctional phenolic compound co-reacted in said reaction product.

4. The polycarbonate resin of claim 3, having co-reacted therein at least 2.5 percent by weight of the fluorinated difunctional phenolic compound.

5. A polycarbonate comprising a copolycarbonate resin which is the reaction product of:
   (a) a fluorine-free aromatic diol;
   (b) a fluorinated difunctional phenolic compound represented by the structural formula:

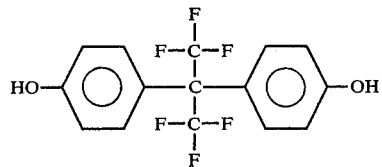

and;
   (c) a member selected from the group consisting of carbonyl bromide, phosgene, bischloroformic esters of (a) or (b) and diaryl carbonates.

6. The polycarbonate of claim 5, wherein said aromatic diol is bisphenol A.

7. The polycarbonate of claim 5, wherein said fluorinated difunctional phenolic compound is present at up to a level of 10 percent by weight based on the total weight of aromatic diol.

8. The polycarbonate of claim 7, wherein said fluorinated difunctional phenolic compound is present at a level of at least 2.5 percent.

9. A method of preparing a polycarbonate resin reacting:

(a) a fluorine-free aromatic diol; and
(b) a fluorinated difunctional phenolic compound represented by the structural formula:

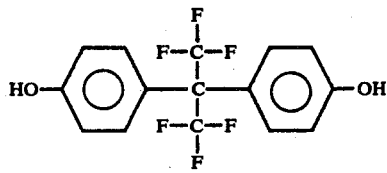

with
(c) a member selected from the group consisting of carbonyl bromide, phosgene, bischloroformic esters of (a) or (b) and diaryl carbonates.

10. The method of claim 9, wherein said aromatic diol is bisphenol A.

11. The method of claim 9, wherein said fluorinated difunctional phenolic compound is reacted at a level of up to 10 percent by weight based on the total weight of diol incorporated into the copolymer.

12. The method of claim 11, wherein said fluorinated difunctional phenolic compound is incorporated into said copolymer at a level of at least 2.5 percent by weight.

13. A thermoplastic injection moldable polycarbonate comprising the synthesis product of 2,2-bis(4-hydroxyphenyl)-propane and between about 2.5 and 10 wt. % of 2,2-bis(4-hydroxyphenyl)-1,1,1,3,3,3-hexafluoropropane and a member selected from the group consisting of carbonyl bromide, phosgene, bischloroformic ester of 2,2-bis(4-hydroxyphenyl)-propane, bischloroformic ester of 2,2-bis(4-hydroxyphenyl)-1,1,1,3,3,3-hexafluoropropane and diaryl carbonates.

* * * * *